Figure 1:
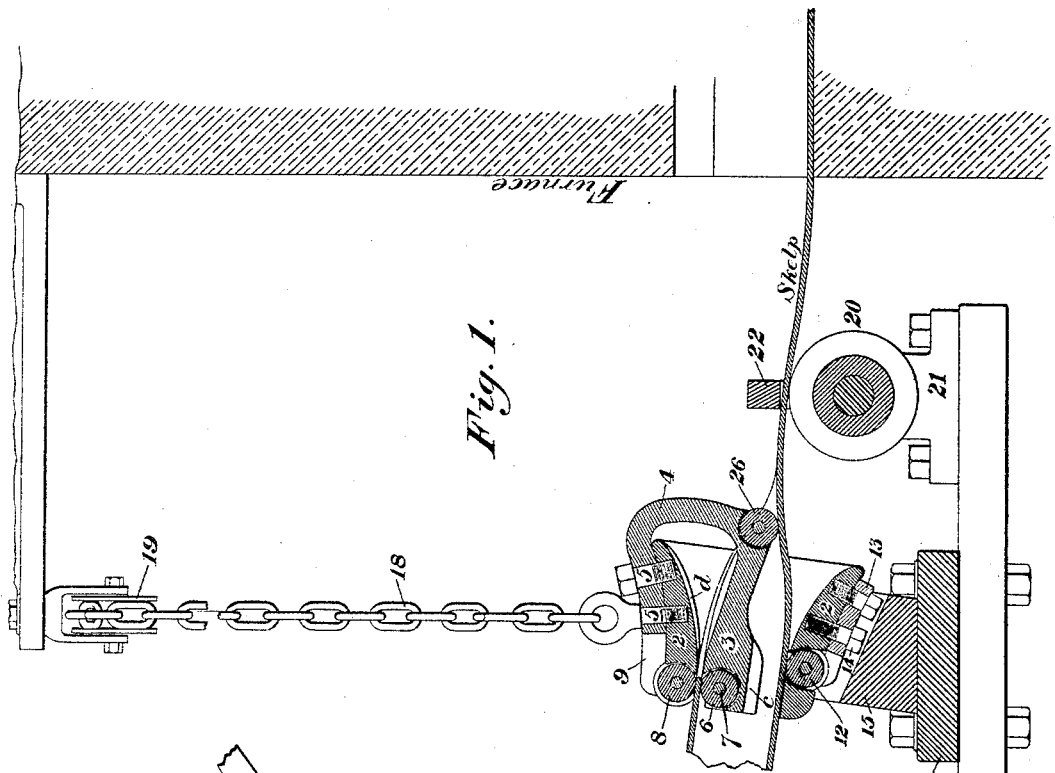

(No Model.) 6 Sheets—Sheet 1.

J. SIMPSON.
PIPE WELDING APPARATUS.

No. 437,725. Patented Oct. 7, 1890.

WITNESSES
Thomas W. Bakewell
H. L. Gill

INVENTOR
James Simpson (No Model.) 6 Sheets—Sheet 2.
J. SIMPSON.
PIPE WELDING APPARATUS.

No. 437,725. Patented Oct. 7, 1890.

WITNESSES
Thomas W. Bakewell
N. L. Gill

INVENTOR
James Simpson (No Model.) 6 Sheets—Sheet 3.

J. SIMPSON.
PIPE WELDING APPARATUS.

No. 437,725. Patented Oct. 7, 1890.

WITNESSES
INVENTOR (No Model.) 6 Sheets—Sheet 4.

J. SIMPSON.
PIPE WELDING APPARATUS.

No. 437,725. Patented Oct. 7, 1890.

WITNESSES
Thomas W. Bakewell
H. L. Gill

INVENTOR
James Simpson

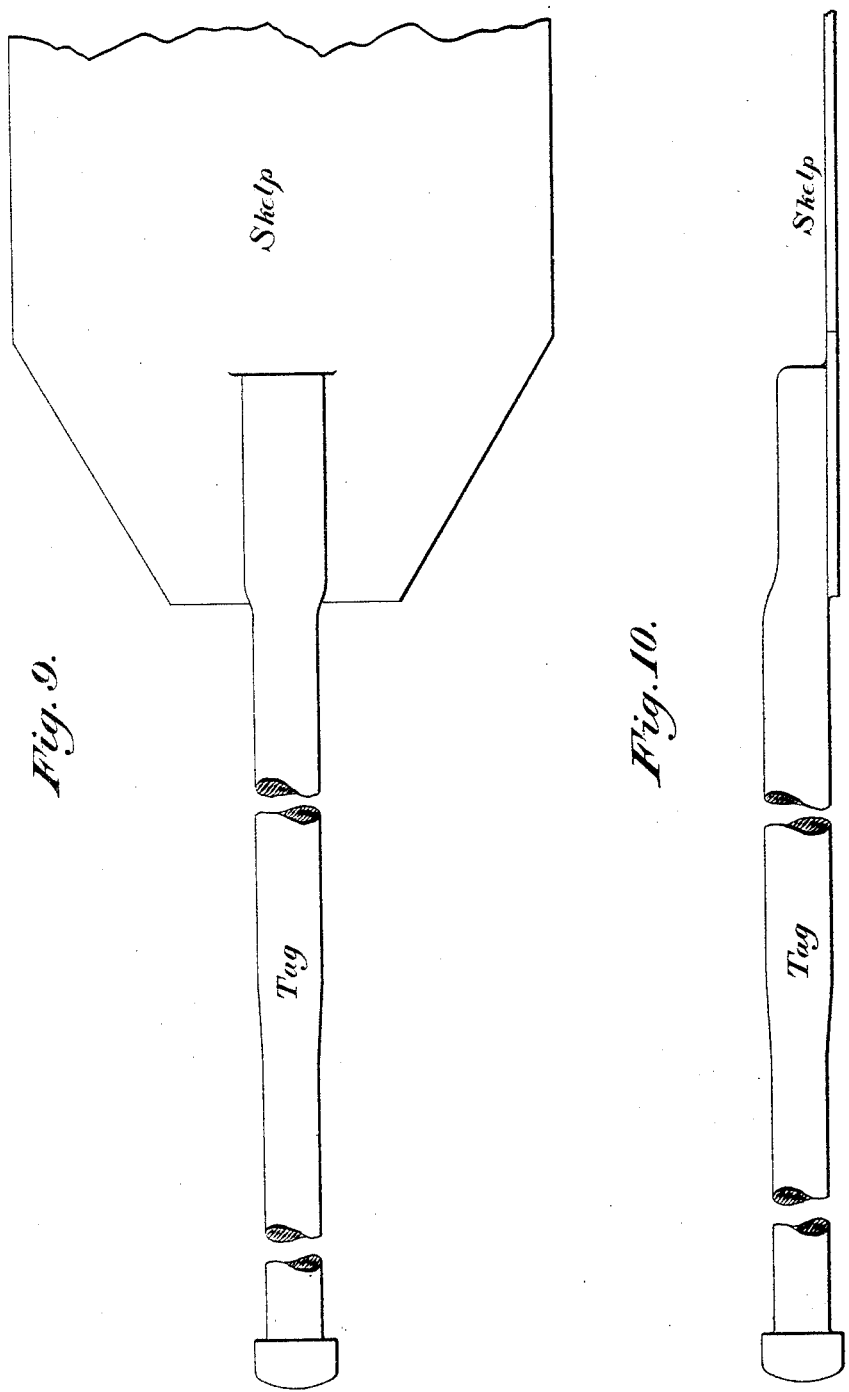

(No Model.)  6 Sheets—Sheet 6.

J. SIMPSON.
PIPE WELDING APPARATUS.

No. 437,725.  Patented Oct. 7, 1890.

WITNESSES
Thomas W. Bakewell
N. L. Gill

INVENTOR
James Simpson

UNITED STATES PATENT OFFICE.

JAMES SIMPSON, OF McKEESPORT, PENNSYLVANIA.

PIPE-WELDING APPARATUS.

SPECIFICATION forming part of Letters Patent No. 437,725, dated October 7, 1890.

Application filed May 8, 1890. Serial No. 351,021. (No model.)

*To all whom it may concern:*

Be it known that I, JAMES SIMPSON, of McKeesport, in the county of Allegheny and State of Pennsylvania, have invented a new and useful Improvement in Pipe-Welding Apparatus and in the Art of Pipe-Welding, of which the following is a full, clear, and exact description.

The usual process of making butt-welded pipe is by drawing a heated plate or skelp of iron through a conical bell, which turns up the edges of the iron, brings them in contact, and causes them to weld together. Lap-welded pipe is made by turning up skelp-iron having scarfed edges and then rolling it with an internal supporting-mandrel, so as to weld the overlapping scarfed edges.

My present invention relates to an improvement in pipe-welding bells, and it has resemblance in some respects to the improvement for which on January 28, 1890, I obtained United States Letters Patent No. 420,213.

It consists, first, in the internal shape of the bell, which is provided with a tapering recess adapted to permit the overlapping of the edges of the skelp in the manufacture of lap-welded tubing in the bell.

It consists, second, in an improvement in the art of pipe-making by scarfing the edges of the skelp, drawing it through a bell, and supporting the interior of the skelp so as to cause the overlapping edges to weld and to form a lap-joint.

It consists, third, in scarfing the skelp with a peculiar scarf, as hereinafter set forth.

Figure 2:
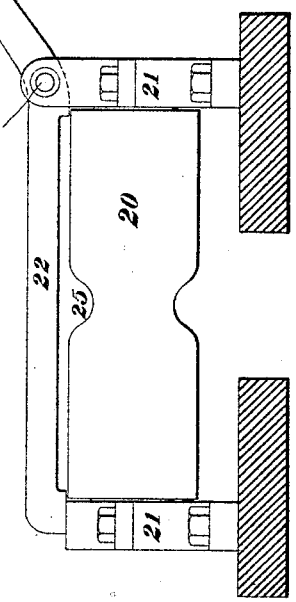
Figure 3:
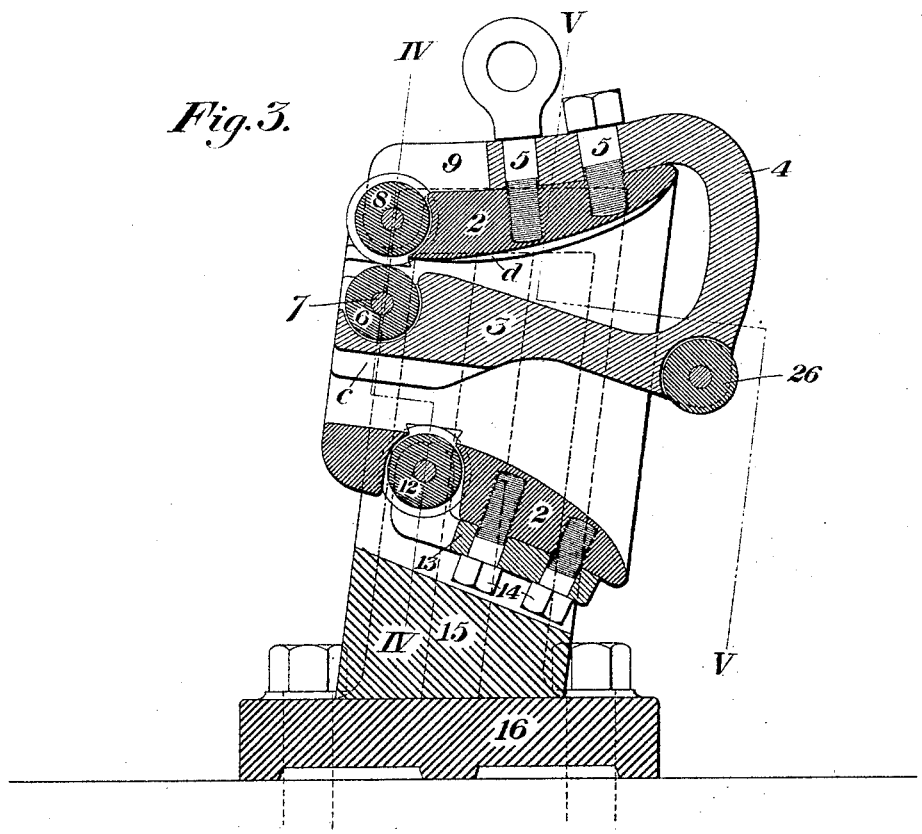
Figure 4:
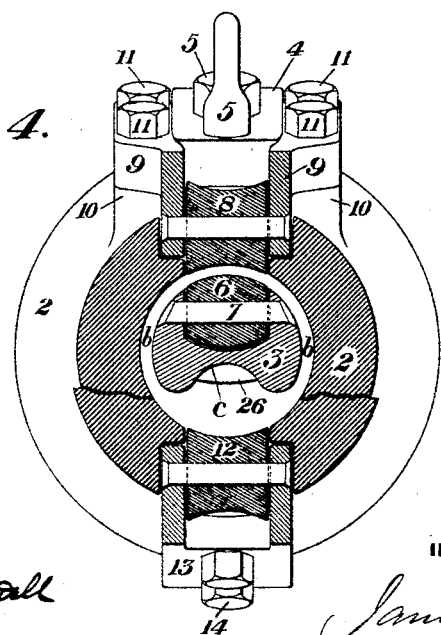
Figure 5:
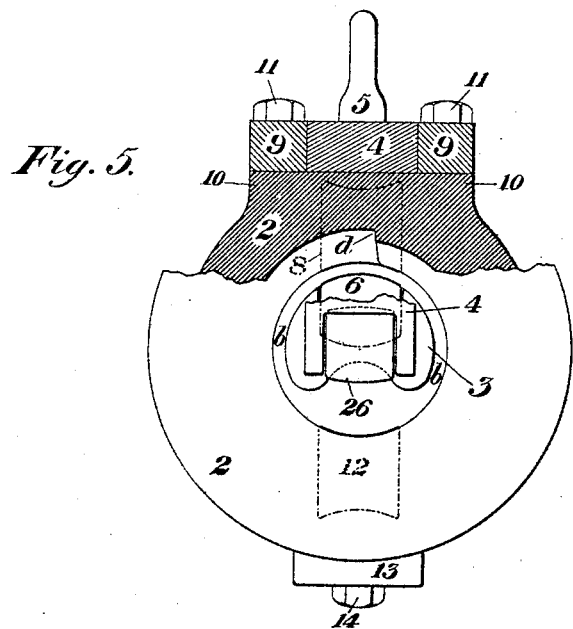
Figure 6:
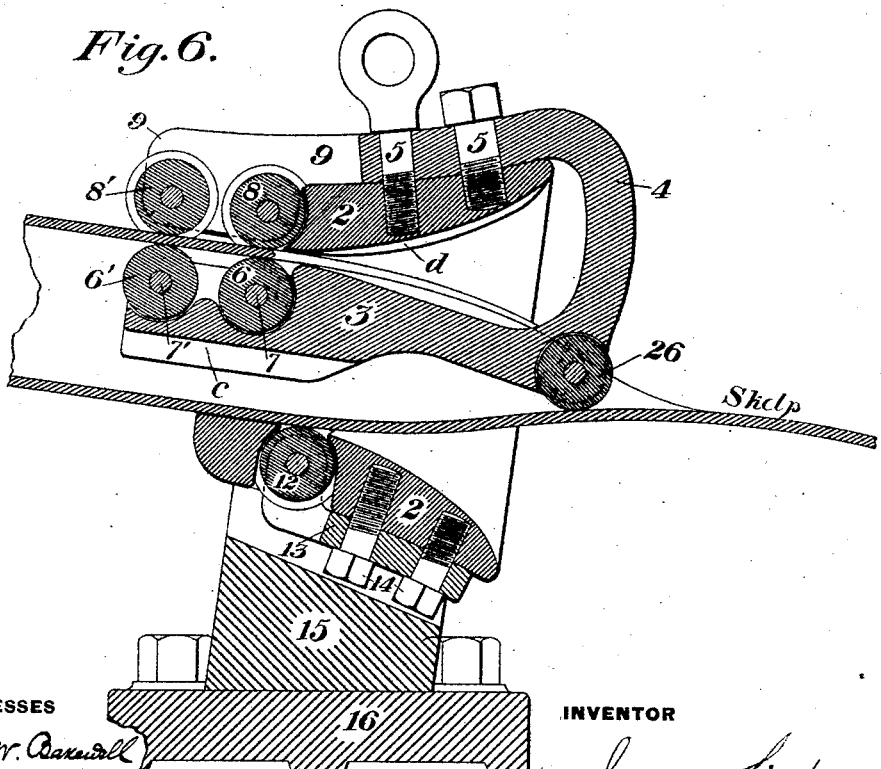
Figure 7:
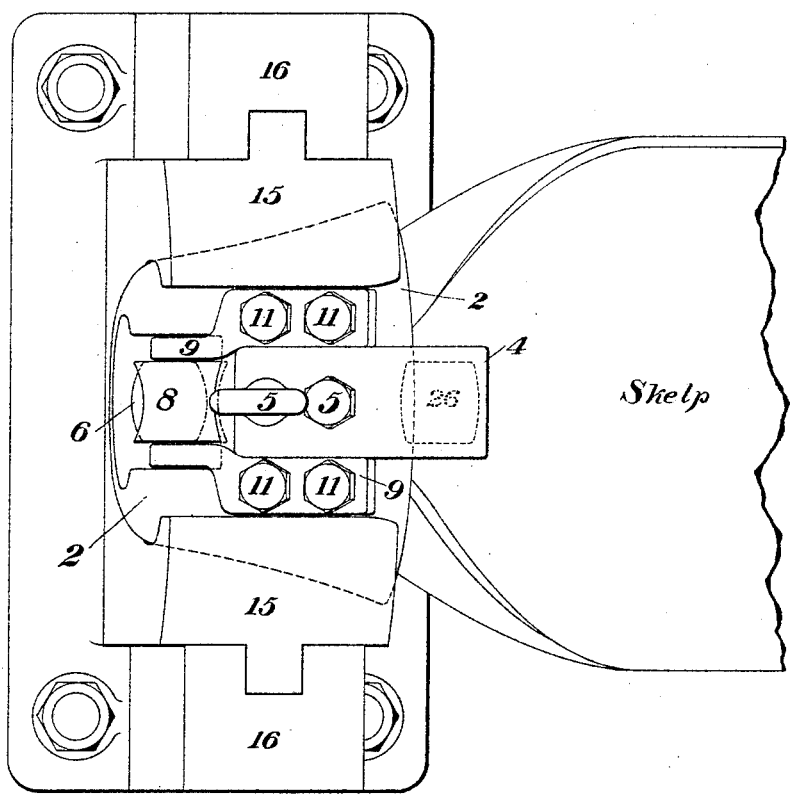
Figure 8:
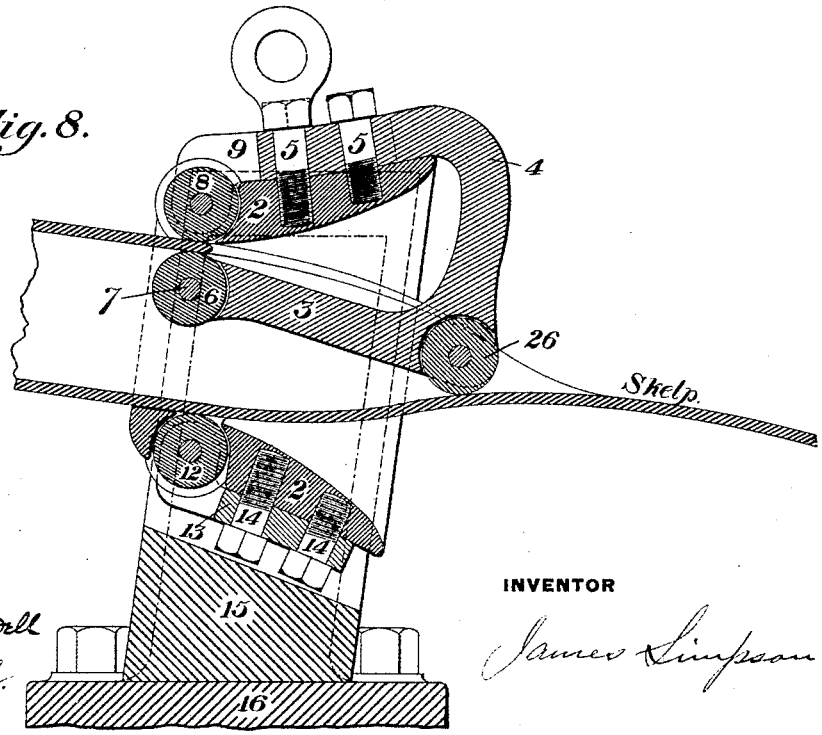
Figure 14:
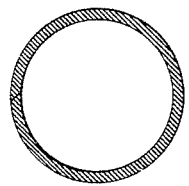
Figure 12:
Figure 13:
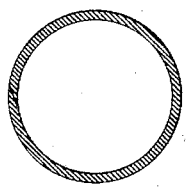
Figure 11:

In the accompanying drawings, forming part of this specification, Figure 1 is a vertical longitudinal section of my improved pipe-welding apparatus. Fig. 2 is a front elevation of the skelp-supporting roller at the back of the bell. Fig. 3 is a vertical central section showing on a larger scale the bell of Fig. 1 and its holder. Fig. 4 is a vertical cross-section of the bell on the line IV IV of Fig.
3. Fig. 5 is a rear elevation of the bell shown in Fig. 3, partly in section on the line V V of said figure. Fig. 6 is a vertical central section showing a modified construction of the bell. Fig. 7 is an enlarged plan view of the bell shown in Fig. 1. Fig. 8 is a vertical central section of a modified construction of the bell. Figs. 9 and 10 are respectively a plan view and side elevation of the end of the skelp and the tag. Fig. 11 is a cross-section showing the skelp scarfed to fit it for making lap-welded pipe. Fig. 12 is a similar view of the skelp, showing its edges scarfed to adapt it to the manufacture of butt-welded pipe. Figs. 13 and 14 are pipes having each kind of weld.

Like symbols of reference indicate like parts in each.

In the drawings, Figs. 1, 3, and 4, 2 represents the pipe-welding bell, which is approximately of the form of the bells now commonly employed for making butt-welded pipe.

3 is a tongue or mandrel, which extends into the interior of the bell from the rear or larger end thereof, and which may be provided with an upwardly-extending bracket 4, having a bent portion which fits on the top of the bell, and is secured thereto by bolts 5 in the manner described in my prior patent, No. 420,213. The front portion of the tongue 3 is constructed as shown in Fig. 4, being formed in a circular arc in cross-section and set concentrically in the bell, so as to leave an intermediate space $b$, which is approximately equal to the thickness of the skelp-iron. The circular portion of the tongue does not, however, extend around its entire circumference; but at its under part it is cut in, as at $c$, to form a space for the passage of the tag in the operation of drawing the skelp through the bell. On the upper side of the tongue 3 is a recess, in which is set a roller 6, journaled on a pin 7, extending through the roller and through the tongue. The periphery of the roller is curved laterally to conform to the curvature of the tongue 3 and projects slightly above the surface of the tongue, so as to form a support for the skelp on the inner side of the seam during the welding of the pipe. There is also a recess formed in the bell directly opposite to the position of the roller 6, and in this recess there is journaled a roller 8, whose periphery is laterally concave to conform to the curvature of the interior of the bell. The roller is journaled in said recess, preferably, as follows: Straps 9, having curved ends, are set on seats 10 on the bell at the sides of the strap of the bracket 4, and their curved ends project into the recess on the top of the bell, forming brackets between which the roller 8 is journaled. These straps 9 are held to the bell by bolts 11. The roller 8 may be otherwise journaled; but the device which I have described for this purpose is convenient, since if the roller becomes worn the straps may be removed and a new roller substituted without difficulty; or if the bell should become worn out the straps and roller may be removed for use on another bell. I prefer also to use another roller 12 on the side of the bell opposite to the roller 8. This roller is set in a recess formed in the bell, so that its periphery shall project but slightly to the interior of the bell, and it is journaled between lugs formed at the ends of a strap 13, which is held to the bell by bolts 14. The purpose of this roller is to enable the skelp to be drawn through the bell without the great friction and wear on the bottom of the bell which ordinarily take place. In the use of this bell it is placed in a bell-holder 15, which is set in the usual bracket 16 in front of the furnace-door, as shown in Fig. 1, and the bell may be upheld by a chain 18, running over an overhead pulley 19. The bell-holder, instead of being set in the usual vertical position, is somewhat inclined toward the furnace. The reason for this position of the bell-holder is that in practice the pipe, passing from the bell, tends to curve upward and to wear the edges of the bell, and by setting the bell in this inclined position its face is brought nearly at right angles to the natural course of the pipe and this wear is prevented. After heating the skelp the tag is passed through the hole $c$ and the skelp is drawn through the bell, the action of which turns up the skelp around the tongue 3 and welds the edges together to form the pipe. The seam of the pipe is directly between the rollers 6 and 8. The roller 6 supports the seam, and the three rollers 6, 8, and 12 reduce the friction of drawing the pipe through the bell and enable it to be drawn with less effort and better results than have heretofore been possible. The use of this form of bell enables me not only to make butt-welded pipe, in which the weld is formed by the meeting of squared edges of the skelp, but also to lap-weld the pipe. To fit the bell for lap-welding, I cut away the interior of the bell, as shown in Figs. 1, 3, and 5, so as to make a lateral recess $d$, extending partly around the periphery of the interior and tapering toward the smaller end of the bell, said recess being adapted to receive one side of the skelp as it is turned up and to permit the edge of the other side to lap in under it. For this purpose the skelp is scarfed, as shown in Fig. 11, and as the recess $d$ in the bell tapers toward its smaller end the scarfed edges of the skelp are drawn together into lapping contact between the rollers. In thus lap-welding the pipe, the edges being turned up by the bell so as to overlap each other, as shown in Fig. 13, the pressure on these edges between the rollers 6 and 8 forces them together and causes them to weld perfectly at one operation. The tongue 3, fitting in the interior of the skelp, supports it during the welding process, keeps it from turning in, and makes a pipe of very excellent form; and in order that the rollers may exert sufficient pressure on the seam of the skelp the tongue 3 may be made of spring metal, and may be adjusted by inserting or removing liners from beneath the bracket 4 on top of the bell and by tightening up the bolts 5.

I believe I am the first to make lap-welded pipe by means of a bell, and desire to claim the same broadly. Its advantages will be readily understood. A lap-welded pipe is much stronger than a pipe having a butt-weld, and its manufacture by means of a bell is much cheaper and less laborious than the usual process of manufacture by rolls and mandrels.

In order to center the skelp properly in the bell and to prevent its twisting in its passage therethrough, I may employ a roller 20, interposed between the bell and the furnace and journaled in bearings 21, provided with a bar 22, overlying the roller, pivoted at 23, and provided with a hand-lever 24. The roller has at its middle portion a peripheral groove 25 to permit passage of the tag. In inserting the skelp into the bell, the bar 22 being raised, the tag is placed in the groove 25 and passed through the bell, and the bar 22 is then lowered into the position shown in Fig. 2. This insures the accurate adjustment of the tag in the bell, and throughout the drawing of the skelp the bar 22 prevents the skelp from twisting and maintains the seam in a single straight line at the middle of the rollers 6 and 8, while the roller 20 serves as anti-friction means to support and facilitate the passage of the skelp. Its action in this regard is shown clearly in Fig. 1. The bar 22 may consist of a roller journaled on its longitudinal axis.

In Fig. 6 I show a modified form of the apparatus, in which, instead of employing a single roller 6 at the end of the tongue 3, I employ two such rollers 6 6′, and directly opposite thereto, in the bell 2, I journal two other rollers 8 8′. The purpose of thus employing two sets of rollers is to increase their welding action on the skelp and to render it more thorough; otherwise the construction of this bell may be the same as that shown in Fig. 3. In both these forms of bell I show the arm 3 provided with an anti-friction roller 26, journaled at its heel and adapted to bear on the middle of the skelp at its entrance into the bell to prevent buckling of the skelp at that place.

In Fig. 8 I show the bell constructed for use in making butt-welded pipe. The difference between this construction and that of Fig. 3 is that the bell is not provided with the recess to permit the lapping of the edges of the skelp, but is internally of circular cross-section, and that the tongue 3 need not be so large in cross-section. In making pipe by this bell the edges of the skelp may be squared in the usual manner; but I prefer to scarf them slightly, as shown in Fig. 12, so that when they meet their edges shall be inclined to afford faces, which in abutting are wedged in against each other just in the rear of the rollers, and are welded thoroughly by the compressing action of the latter when the seam passes between them. This form of weld is a species of lap-welding. The bell shown in Fig. 8 may be provided with the sets of double rollers, as shown in Fig. 6.

I do not claim herein, broadly, the rollers having bearings on the skelp, as described, nor the device at the rear of the bell for preventing twisting of the skelp, nor the formation of the tongue 3, with the tag-space $c$, nor the backwardly-inclined bell-holder, since these items of invention are embodied in a divisional patent application filed by me on September 8, 1890, Serial No. 364,219.

I claim as my invention—

1. The combination of a pipe-welding bell having in its interior a lateral recess to permit overlapping of the skelp and a tongue within the bell, adapted to support the seam, substantially as and for the purposes described.

2. The combination of a pipe-welding bell having in its interior a lateral recess to permit overlapping of the skelp, a tongue within the bell adapted to support the seam, and a roller 8, situate at the interior of the bell and adapted to act in conjunction with the tongue to weld the seam, substantially as and for the purposes described.

3. An improvement in the art of pipe-welding, which consists in scarfing the edges of the skelp, drawing it through a bell, and supporting the interior of the skelp opposite to the seam, thereby causing the overlapping scarfed edges to weld and to form a lap-joint, substantially as and for the purposes described.

4. An improvement in the art of pipe-welding, which consists in scarfing the edges of the skelp, as shown in Fig. 11, drawing the skelp through a bell, and welding it thereby, substantially as and for the purposes described.

In testimony whereof I have hereunto set my hand this 29th day of April, A. D. 1890.

JAMES SIMPSON.

Witnesses:
 Thomas W. Bakewell,
 H. L. Gill.